Patented June 25, 1946

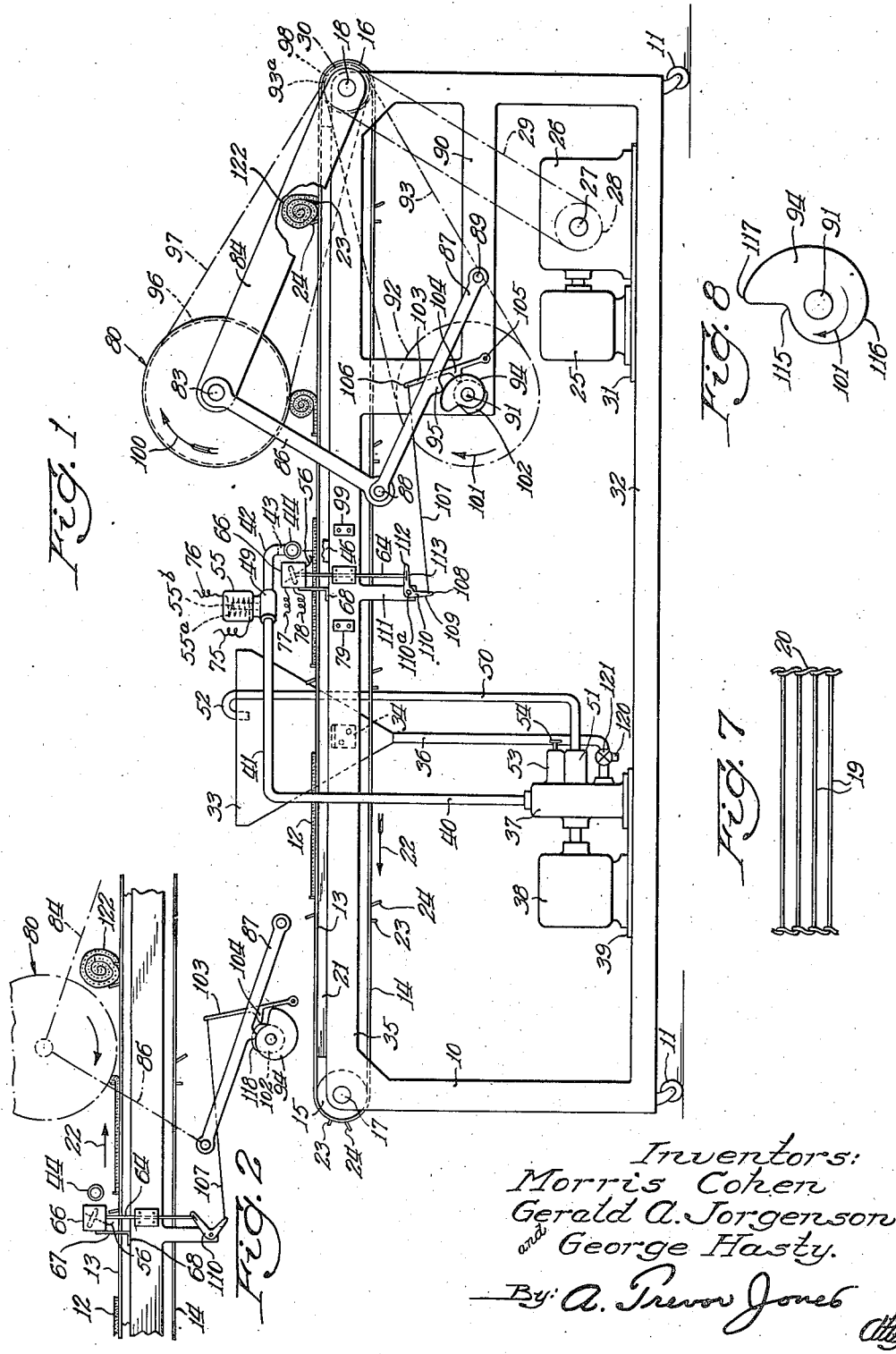

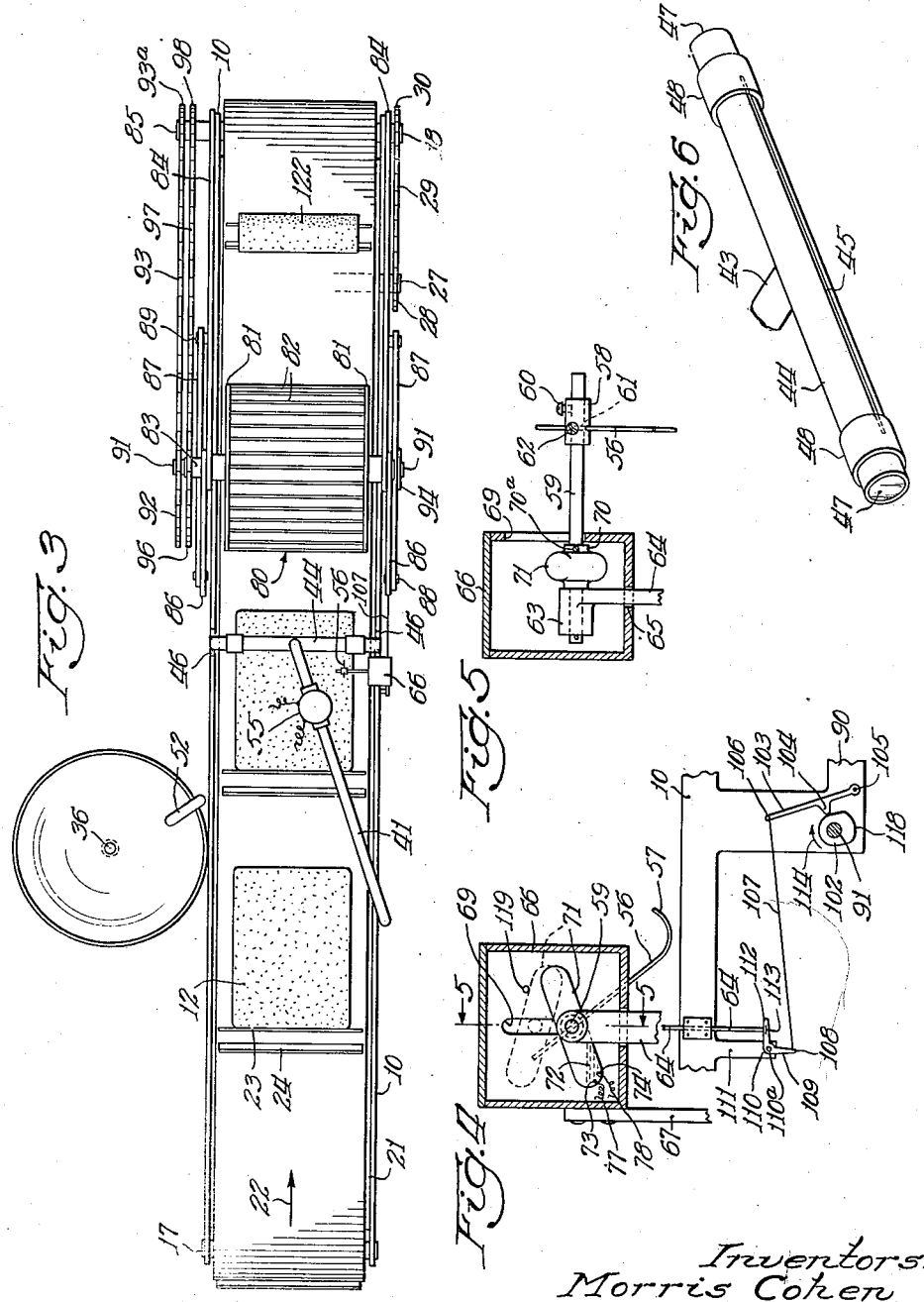

2,402,874

UNITED STATES PATENT OFFICE 2,402,874

COATING AND ROLLING APPARATUS OR THE LIKE

Morris Cohen, Kansas City, Mo., and Gerald A. Jorgenson and George Hasty, Chicago, Ill., assignors to Interstate Bakeries Corporation, Kansas City, Mo., a corporation of Delaware Application March 8, 1944, Serial No. 525,556

12 Claims. (Cl. 107—9)

This invention relates to coating and rolling apparatus or the like more especially for treating slabs of material which may have a coating disposed thereon preliminary to a rolling-up step and the invention is of particular utility in the production of so-called jelly rolls or the like in commercial bakeries.

The well-known bakery product commonly called a jelly roll may consist of a quantity of batter which is first formed as a flat baked slab of, say, sponge cake, upon the upper surface of which is spread a coating of fruit jelly or the like, the slab being then rolled-up, with the jelly coated surface innermost, to form a roll, the coils of the roll advantageously showing at the ends of the roll to display the jelly content.

Among other objects, the present invention aims to provide mechanical means for the production of such jelly rolls with a minimum of manual handling, while at the same time insuring a more uniform disposition of the jelly upon the cake preliminary to rolling-up, and the production of a more uniform coil or roll in the final product.

These and other objects will be more fully pointed out in the following specification, and by reference to the accompanying drawings, forming a part thereof, in which—

Figure 1 is a side elevational view of a machine constructed in accordance with the present invention, being somewhat schematic and with parts broken away for clearness of description;

Figure 2 is a fragmentary schematic view of parts shown in Fig. 1 in changed position;

Figure 3 is a plan view of the machine shown in Fig. 1;

Figure 4 is a fragmentary view of parts shown in Fig. 1, with certain parts enlarged;

Figure 5 is a sectional view taken on the line 5—5 of Fig. 4, looking in the direction of the arrows;

Figure 6 is a detached enlarged view of the coating spreader shown in Figs. 1, 2, and 3, rotated ninety degrees to show the elongated discharge orifice therein;

Figure 7 is a fragmentary enlarged view of a section of the rod belting employed in the structure of Figs. 1 and 2; and Figure 8 is a slightly enlarged separated view of the main cam.

Referring in detail to the illustrative apparatus shown in the drawings, the support or table 10 is desirably mobile as by having the casters 11 by which the table may be located on the floor of the bakery, with its receiving end, shown at the left-hand side of Figs. 1 and 3, adjacent a moving conveyor or other transfer means (not here shown) for delivering to the apparatus of the present invention a body such as the cake slab indicated by numeral 12.

The table 10 provides a frame for the apparatus herein described and which includes a platform to receive the slab 12 thereon. As here shown this platform is the upper run 13 of the endless conveyor belt 14 which is entrained about the conveyor windlasses 15 and 16, one at each end of the table 10, and consisting of cylinders having their axles 17 and 18 journaled in the table frame adjacent each upper corner of the latter.

The conveyor belt 14, as best seen from a section thereof shown in Fig. 7, is advantageously made up of a series of parallel metal rods 19, the ends of each rod being bent toward an adjacent one of the rods and loosely looped thereabout as at 20 to form a continuous belt which is extremely flexible in the direction of its length as a whole, while at the same time, the individual rods 19 are themselves substantially rigid and provide a firm platform when supported by the tracks 21 running along each side of the table and forming a part thereof.

The conveyor is adapted to move in the direction of the arrow 22 and carries flight lugs 23, against a rear one of which the cake slab 12 is initially abutted as it is disposed on the belt by any suitable means, the table being of such length that a number of such slabs may be traveling on the belt simultaneously. To the rear of each flight lug 23 is an auxiliary flight lug 24, the purpose of which will be later explained. For the present, it may be pointed out that the flight lugs 23 and auxiliary flight lugs 24 may be also advantageously formed from metal rods similar to the rods 19 and suitably secured at their ends to the latter at appropriate distances apart on the belt to project slightly therefrom.

The belt 14 is shown driven by an electric motor 25 connected with a speed-reducer 26, the out-put shaft 27 of which carries a sprocket wheel 28 upon which is entrained a driving chain 29 which also entrains about a sprocket 30 keyed to the axle 18 of the conveyor windlass 16. The motor 25 and speed-reducer 26 are conveniently mounted on the table 10 as by being secured on a base plate 31 fastened across the lower reaches 32 of the table.

The apparatus includes a pair of treating means for treating articles such as the cake slabs already referred to, one of the treating means being a dispensing device for applying the coating, such as a layer of fruit jelly, to the slab before it is rolled-up, and the other treating means being for rolling-up the slab after the coating has been applied thereto. Both the coating means and the rolling-up means are partly actuated by relative movement between themselves and the conveyor upon which the slabs are carried, as will be next described in detail, and following the present invention.

Turning first to the coating device, this includes in this instance, the hopper 33 suitably attached at 34 to one of the upper reaches 35 of the table and offset laterally therefrom. The hopper 33 affords a reservoir for a supply of fruit jelly, in a fluid state, which travels by gravity down the pipe 36 leading from the reservoir to the pump 37, which is driven by an electric motor 38. The pump 37 and motor 38 may be carried by the table on the base plate 39 fastened across the lower reaches 32 of the table suitably spaced from the motor 25 previously referred to.

Rising from the pump 37 is a delivery pipe 40 which is bent to clear the side of the table and is then turned horizontally across the conveyor belt as at 41 to bring its slightly turned down discharge end 42 over the longitudinal center line of the conveyor. In the discharge end 42 is secured, as by a snug frictional fit, the short spud 43 of an inverted T-shape transverse spreader nozzle 44. In the lower face of the latter is an elongated relatively narrow orifice 45.

A pair of brackets 46 at each side of the table afford auxiliary holders for the free ends of the spreader nozzle 44, which, as will be understood, is closed at both ends as at 47. Adjacent these ends of the nozzle are a pair of sleeves 48 which have a snug sliding fit thereon and are thereby adjustable to reduce or extend, within the limits of the lengths of these sleeves, the length of the orifice 45, as best shown in Fig. 6.

The pump 37, which may be of a conventional herringbone or spiral type, is adapted to force the fluid up through the delivery pipe 40 and to the spreader nozzle 44 under pressure, from which the fluid, such as the fruit jelly, may be transmitted through the elongated orifice 45 (which is substantially of a length equal to the width of the slab 12) and disposed on the upper surface of a slab 12, as indicated somewhat diagrammatically in Fig. 1.

Since it is of course desirable that the jelly be emitted only while a slab is under the spreader nozzle to receive the jelly, the discharge is here controlled by an electro-magnetic valve mechanism 49, the valve of which is interposed in the pipe 40 between the pump and the nozzle. When the valve of the valve mechanism 49 is closed to keep the fluid under pressure from reaching the nozzle, continued circulation of the fluid is permitted, and, consequently, continuous operation of the pump 37, by reason of an overflow pipe 50 which at its lower end is connected into a relief-port mechanism 51 in the pump 37 and at its upper end is turned downwardly as at 52 to return the jelly into the upper open end of the reservoir 33.

The relief-port mechanism 51 advantageously includes a check valve which is controlled by a spring-loaded device 53 to predetermine the pressure in the delivery pipe 40 at which the fluid will pass through the relief-valve mechanism 51 and be passed back to the reservoir. This pressure point may be varied, to suit operating conditions, by manipulation of a regulator comprising an adjusting thumb-screw 54 to vary the force of the spring, as is well known in valve mechanisms of this type.

The pump 37 and its associated mechanism 51, 53, and 54 need not here be described in further detail as they are obtainable on the market, and this is true also of the electromagnetic valve mechanism 49, it being sufficient to remark here that the latter may be of the well-known solenoid type having the usual coil 55a and plunger 55b contained within the solenoid casing 55.

When one of the slabs 12 passes under the spreader nozzle 44, the slab itself kicks a trigger 56 or other actuating means for opening the valve of the valve mechanism 49 to admit the jelly under pressure to the spreader nozzle, from where it is disposed by gravity through the orifice onto the cake. As here shown, the trigger 56 is in the form of a wire rod having a turned up lower end 57 which rides on the cake when a cake is thereunder and which is swung forwardly and upwardly by the cake slab. The trigger 56 is mounted on a collar 58 (Fig. 5) which is slidingly and rotatively adjustable on a spindle 59, as by means of a set-screw 60. The trigger 56 passes through a transverse aperture 61 in the collar 58 and is adjustable therein by another set-screw 62. Thus the height and angle of the lower end of the trigger may be adjusted to accommodate predetermined differences in the thickness of the cake slab. Since the trigger itself is somewhat flexible and resilient, minor or accidental fluctuations in the thickness of the slabs are automatically accommodated.

The spindle 59, at its outer or opposite end from where it carries the trigger, is rotatable in a bearing 63 formed at the upper end of a vertical bar 64, which latter passes through an opening 65 in the lower face of a switch-box 66, the latter in turn being fixedly secured to an upright 67 rigidly mounted on the table frame part 35, as at 68, slightly to the rear of the spreader nozzle 44. The bearing 63 is thus contained within the switch-box. The side face of the switch-box 66 nearest the trigger 56 has a vertically elongated slot 69 therein through which the spindle 59 passes, and the latter carries, within the switch-box, and rigidly with the spindle, as by a set-screw 70a, the hub 70 of a mercury tube 71 which is intermedially mounted on the spindle transversely thereof.

When the spindle 59 and with it the mercury tube 71 is rotated in the bearing 63 by the trigger 56, actuated by the cake slab, to the position shown in full lines in Fig. 4, and as indicated in in Fig. 1, the pool of mercury 72 in the tube flows by gravity to the end of the tube in which the contacts 73 and 74 enter and the circuit is thereby completed across these contacts, which, when the motor 38 is in circuit and the pump 37 running, also completes a circuit through the leads 75 and 76 of the coil 55a of the solenoid mechanism 55, thereby attracting and elevating the plunger 55b and opening the valve of the valve mechanism 49.

When this occurs, the fluid jelly flows under pressure to be dispensed through the spreader nozzle 44 onto the cake slab and the valve of the valve mechanism is held open until the mercury tube 71 is tilted in the opposite direction, as indicated in dotted lines in Fig. 4, and also as indicated in Fig. 2, to cause the pool of mercury in the tube to run to the other end of the latter thereby removing it from the contacts 73 and 74, which breaks the circuit through the leads 75 and 76 and through the coil of the solenoid mechroller 80 and its associated pair of arms 84 and toggle levers 86—87 causing the cam follower 95 to drop into the cam depression 115, and thus permitting swinging movement of the roller 80 toward the table), the position of the parts is somewhat as indicated in Fig. 2. It will be seen that the roller 80 at this time almost touches the upper run 13 of the belt 14. Consequently when the cake slab 12, which has just passed under the jelly spreader 44 and has had a coating of jelly deposited thereon, approaches the roller 80, carried there toward by the upper run 13 of the belt 14, the leading edge of the cake slab is picked up by the rotating roller 80, the rib-like character of the roller periphery provided by the rods 82 of which it is formed contributing to prevent slippage between the roller and cake slab. Thus, since the periphery of the roller 80 where engaged by the cake slab is moving in the opposite direction from the later, the roller begins to roll up the cake slab, the lug 23 assisting to maintain the cake slab from slipping away from the roller.

At this time also, as seen from Fig. 2, the trailing edge of the cake slab has passed beyond the jelly spreader 44 and there is an interval before the next succeeding cake slab approaches the jelly spreader. This interval may be, and in this instance is, such that it begins substantially coincident with the dropping of the cam follower 95 into the depression 115 of the cam 94 in the cam cycle. At about the same time, a cam rise 118 on the cam 102 (which rise is located circumferentially so as to occur, in the common rotation of the cams 94 and 102 on the countershaft 91, in the vicinity of the depression 115 of the cam 94) moves the tappet 103 on its pivot 105 in a direction toward the right in the figures of the drawings, so that the bell-crank 109 is rocked to cause elevation of the reciprocable vertical bar 64.

Elevation of the bar 64 carries with it, at its upper end within the switch-box 66, the spindle 59 to which is fixed the mercury tube 71. As the tube rises under the influence of the bar 64 (the spindle 59 moving upwardly in the slot 69), one end of the tube, that is the end opposite its end in which the contacts 73 and 74 enter, engages a tripping member such as a stop pin 119 fixed to the inner wall of the switch-box 66, and is thereby tilted to the position shown in dotted lines in Fig. 4, and also shown in Fig. 2, which causes the pool of mercury to flow away from the contacts 73 and 74, breaking the circuit and discontinuing the electric current through the coil 55a of the solenoid 55. This permits the plunger 55b to drop and the valve of the valve mechanism 49 to close under the pressure of the fluid in the pipe 40, so that the discharge of jelly through the spreader 44 is discontinued during the interval when there is no cake slab beneath the spreader.

From the cam depression 115, the cam follower 95, riding on the progressively increasing cam rise 116, causes the toggle lever 86—87 to tend to straighten out and thus urges the roller 80 upwardly away from the table as the cake roll increases in diameter with the rolling up of a slab 12, the roller 80 nevertheless continuing to maintain contact with the cake roll to continue the coiling action upon the latter. Thus the roller 80 rises both to continue to roll up the cake roll as the latter gets larger and also to afford space for the cake roll as the latter gets larger. When the cake roll is completely coiled and is thereby at the maximum of its diameter, the cam follower 95 is at the maximum of the cam rise 117 of the cam 94, and thereupon the cake roll carried by the upper run 13 of the moving conveyor belt 14 passes beyond the influence of the roller 80.

The jelly roll 122, of well-known character, is now completely formed and ready for delivery to a wrapping machine (not here shown) which may be located adjacent the right-hand or delivery end of the apparatus of the present invention.

In the meantime, as will now be understood, the cycle of operation of the present machine is continuously repeated. That is, for example, after the cam follower 95 leaves the maximum cam rise 117 of the cam 94, it drops again into the cam depression 115 to place the roller 80 once more in position to engage the leading edge of another cake slab 12, to similarly coil the latter. It will be noted that by reason of the contour of the cam 94, the roller 80 drops much more rapidly than it rises, thus quickly placing it in position to engage the next cake slab.

During the time when a cake roll is reaching the maximum of its diameter under the roller 80, at which time the cam follower 94 is approaching the maximum cam rise 117 of the cam 94, the cam follower 104 of the tappet 103 has left the cam rise 118 of the cam 102, which occupies only about one-third of the circumference of the cam 102, the remaining approximately two-thirds circumference of this cam 102 constituting a cam depression for this cam and being substantially uniform throughout this remainder. Thus as shown in Figs. 1 and 4, the bell-crank 109 is permitted to rock under the weight of the bar 64, mercury tube 71, and spindle 59 so that the tube is lowered within the switch-box 66 away from the stop pin 119, and the mercury tube and spindle 59 are again free to rotate in the bearing 63 of the bar 64 under the influence of the trigger 56, actuated by a cake slab 12, to tilt the mercury tube to full line position (Fig. 4). When this again occurs, the pool of mercury 72 is caused once more to make contact with the contacts 73 and 74, and energize the coil 55a of the solenoid 55 to raise the plunger 55b of the solenoid mechanism and open the valve of the valve mechanism 49 against the pressure of the fluid in the tube 40. Thereby the fluid or jelly is again discharged through the spreader 44 onto another cake slab thereunder, this discharge being once more cut-off by the tappet 103, as already described, as the trailing end of the cake slab leaves the vicinity of the spreader.

As a jelly roll is completely formed, in the operation of the apparatus just described, the auxiliary flight lug 24 now comes into play, the jelly roll being carried on the upper run 13 of the belt 14 between the flight lug 23 and the auxiliary flight lug 24, as shown at the right-hand end of Figs. 1 and 3, the arm 84 being here broken away in Fig. 1 so that the jelly roll 122 may be seen. Disposition of the completed jelly roll between the flight lug 23 and auxiliary flight lug 24 is accomplished by the action of the roller 80 just before the completely coiled jelly roll leaves the roller 80, there being sufficient resilience or sponginess in the cake to permit the roller 80 to gently force it over the flight lug 23 but not to force it over the somewhat higher auxiliary flight lug 24, the jelly roll thereby remaining between these flight lugs of a pair as the completed jelly roll leaves the roller 80, and thus being prevented from accidentally uncoiling.

In the practice of one application of the apparatus of the present invention, the cake slabs anism 55. When the latter occurs or when the electric circuit is otherwise discontinued, the valve of the valve mechanism 49, being no longer held open by the solenoid and being now responsive to pressure of the fluid in the pipe 40 leading from the pump 37, closes and remains closed until the solenoid is again energized as described.

Conventional electrical connections may be made to the motor 38 and in parallel to the leads 75 and 76 of the solenoid as well as to the leads 77 and 78 of the mercury switch contacts 73 and 74. These circuits may have therein a master switch 79 conveniently located on the side frame part 35 of table 10.

While the trigger 56 is responsive to gravity, being heavier at its lower end 57 than at its upper end, means are provided to positively rotate the mercury tube 71 to circuit opening position, to effectuate the closing of the valve of the valve mechanism 49 when no cake slab is thereunder, as indicated in Fig. 2. For this purpose the present invention includes a connection between the other one of the article treating mechanisms which the invention contemplates, to control the dispensing device described, independently of the trigger 56, and to positively assure that the dispensing device will be shut-off during certain predetermined intervals in the cycle of operation of the apparatus, such intervals corresponding, in general here, with the spaces between the cake slabs as they pass along. This positive shut-off means will be explained in connection with the second of the article treating mechanisms next described.

Extending across the table 10, and particularly across the platform represented by the upper run 13 of the conveyor belt 14 and in the path of the cake slabs 12 carried thereon, is disposed a roller 80 which is advantageously formed by a pair of end discs 81 spaced apart by substantially rigid metal rods 82, somewhat similar to the metal rods 19 of the conveyor belt 14 and having their ends suitably secured to the end discs 81. The roller thus formed, which is thus somewhat of the so-called squirrel-cage type, is axled as at 83 in a pair of arms 84 which at their opposite ends are pivoted to the end of the table, as upon the axle 18 which is extended at each side of the table, as best shown in Fig. 3, and which at one side carries the sprocket wheel 30 for the driving chain 29 and at the other side is extended as at 85, for purposes presently pointed out. The member 18 thus constitutes a driven shaft and an axle for the conveyor windlass 16 as well as a pivot member for the arms 84. The roller 80 rotates on its axle 83 and at the same time swings downwardly toward and upwardly away from the table under influence of the mechanism next described.

Turning to this mechanism, it includes in the present embodiment of the invention a toggle lever device comprising, as here shown, at each side of the table and spaced outwardly of the pivot arms 84, a pair of toggle links 86 and 87 articulated as at 88. The free end of the upper toggle link is articulated with the outer end of the adjacent pivot arm 84 as by being pivoted on the roller axle 83, and the free end of the lower toggle link 87 is pivoted as at 89 to a hanger 90 of the table frame.

The table hanger 90 at each side of the table supports a countershaft 91 journaled therein and extending therebeyond at opposite sides of the table. At one side, the countershaft 91 has fixed thereto a sprocket wheel 92 upon which is entrained a gear chain 93, meshing with a sprocket 93a keyed to the shaft 18. The countershaft 91 at the opposite side of the table, that is the side nearest the observer looking at Fig. 1, has fixed thereto a somewhat volute cam 94, upon the periphery of which rides a rounded projection 95 formed on the lower edge of the toggle link 87 at this side of the machine, which projection 95 serves as a cam follower.

The axle 83 of the roller 80 has also fixed thereon a sprocket wheel 96 about which is entrained a gear chain 97 which also meshes with the sprocket wheel 98 fixed on the combined pivot and driven shaft 18.

The motor 25 which like the motor 38, may be connected with a source of electric power, not necessary to be here described and with appropriate wiring connections, may be controlled by a switch 99 located on the side frame 35 of the table and conveniently adjacent the switch 79. Upon operation of the motor 25, the driven shaft 18 is caused to rotate in the direction of the arrow 22 and with it the windlass 16 which thus drives the conveyor belt 14 in the same direction. Simultaneously, the countershaft 91 is rotated in the same direction as driven shaft 18, and, similarly, the axle 83 of the roller 80. Consequently the roller 80 will rotate in the direction of the arrow 100 and the cam 94 in the direction of arrow 101, these arrows all indicating rotation in the same direction. At the same time, as the roller 80 rotates, it is swung toward and from the conveyor belt 14, by the action of the volute cam 94 and toggle lever mechanism 86—87. Relatively with respect to the conveyor belt, it may be said that the roller 80 describes a somewhat undulatory motion within the limits and by the gradations determined by the profile or contour of the cam 94, as will be later more particularly explained.

On the same countershaft 91 inwardly of the cam 94, is fixed another cam 102, of a different contour from the cam 94. The purpose of this second cam 102 is to actuate a tappet 103 which has a finger 104 which bears on the periphery of the cam 102 and thus acts as a cam follower for this cam, the tappet being pivoted as at 105 on the table hanger 90. Connected to the free end of the tappet 103 as at 106 is a wire rod 107, the other end of which is attached as at 108 to one furcation 109 of a bell-crank 110 pivoted as at 110a on a depending portion 111 of the table side frame 35. The other furcation 112 of the bell-crank 10 is articulated with the lower end of the vertical bar 64, previously referred to as the member upon the upper end of which is formed the bearing 63 for the spindle 59 of the mercury switch mechanism.

A lost-motion connection at 113 occurs between the furcation 112 of the bell-crank and the lower end of the bar 64, to permit vertical reciprocation of the latter during rocking movements of the bell-crank.

The cam 102 of course rotates in the direction of the arrow 114 (Fig. 4) which is the same direction as that indicated by the arrows 100 and 101 for the roller axle 83 and the counter-shaft 91.

Reverting to the cam 94, the contour of this cam is somewhat volute in the sense that it has a depression 115, and a progressively continuously increasing rise 116, which finds its maximum at 117.

When the cam follower 95 of the toggle link 87 is in the depression 115 (the weight of the are, say, fifteen inches long, eleven inches wide, and about five-eighths inch thick. The jelly roll when rolled-up then has a diameter of about three and three-eighths inches, and the maximum lift of the roller 80 from the upper run 13 of the conveyor belt 14 is approximately three and five-eighths inches, thus allowing the completed jelly roll to pass thereunder. The sprocket 92 on the countershaft 91 and sprocket 96 on the roller 80 each has a suitably greater number of teeth than the sprockets on the driven shaft 18. The sprocket wheel 92 is about twenty-four inches in circumference, and the relative gearing is such that the peripheral speed of this sprocket 92 is the same as the linear speed of the conveyor belt 14. Consequently, the distance between two flight lugs 23 being also about twenty-four inches, the cams 94 and 102 make one complete revolution during the time interval between the passing of two successive flight lugs 23 by a given point in the cycle, thus assuring a complete cycle of operation for each cake slab. Since the roller 80 is also about twenty-four inches in circumference, the peripheral speed of the latter is also approximately the same as the linear speed of the conveyor belt 14. Thus by this or other similar gearing means well-known to workers in the art, the various operations of the apparatus may be completely synchronized for the purposes disclosed.

For purposes of better illustration, the diameters of the roller 80 and sprocket wheel 92 have here been shown somewhat exaggerated and greater than in actual practice when conforming to the preferred dimensions just elucidated, as will be now understood by workers in the art.

To facilitate cleaning of the reservoir 33 and the pipes 36, 40, 50, and pump 37, a drain 120, controlled by a hand valve 121, may be located at the low point of the fluid circulating system.

Manifestly the invention is not limited to details of construction shown for purposes of illustration. Furthermore, it is not to be understood that all features of the invention must always be used conjointly, since various combinations or sub-combinations may at times be advantageously employed.

Such changes may be made as fall within the scope of the following claims without departing from the invention.

Having described the invention, what is here claimed is:

1. Apparatus of the class described comprising a table for moving a coilable slab thereon, fluid dispensing means disposed over the path of said slab, said dispensing means including a pipe carrying the material to be dispensed under pressure, an electro-magnetic valve in said pipe, a switch controlling the valve, a trigger in the path of the slab for at least partially controlling the switch to open the valve, an arm pivoted on the table, a roller for coiling the slab axled on the arm for swinging movement toward and away from the table with the free end of said arm, a toggle device having one end connected with the said arm for swinging the latter and its other end pivoted to the table, a rotatable cam engaging the said toggle device for causing said swinging movement of said roller, a shaft in driving relation to said cam, and a connection between the shaft and the switch for at least partially controlling the valve independently of the trigger to effect closing of the valve.

2. Apparatus of the class described comprising a table for moving a coilable slab thereon, an arm pivoted thereon, a roller for rolling the slab axled in the arm for swinging movement toward and away from the table with the free end of said arm, a second arm carried by the table having one end connected to the first mentioned arm for swinging the latter, a rotatable cam engaging the said second arm for causing said swinging movement of both arms, a shaft in driving relation to said cam, a second cam keyed to said shaft, a cam follower for said second cam, and means at least partially controlled by said cam follower for coating the slab prior to engagement by said roller.

3. Apparatus of the class described comprising a table, an arm pivoted thereon, a roller journaled in the arm for swinging movement toward and away from the table with the free end of said arm, a second arm carried by the table having its free end connected for swinging the first mentioned arm, a rotatable cam engaging the said second arm for causing said swinging movement of both arms together with said roller, a second cam, and coating means controlled at least in part by said second cam.

4. Apparatus of the class described comprising a moving platform for carrying a series of slabs thereon, a trigger in the path of said slabs, a dispensing device at least partially controlled by said trigger, a rolling device, and a connection between the rolling device and said dispensing device for at least partially controlling the latter independently of said trigger.

5. Apparatus of the class described comprising a moving platform for carrying a series of coilable slabs thereon, a coating device, a trigger in the path of said slabs, a switch at least partially controlled by said trigger, an electro-magnetic device controlled by said switch, said device controlling said coating device, a rolling device, and a connection between the rolling device and said switch for at least partially controlling the latter independently of said trigger.

6. Apparatus of the class described comprising a conveyor, a coating device, a trigger adjacent the conveyor, a switch at least partially controlled by said trigger, an electro-magnetic device controlled by said switch, said device controlling said coating device, a rolling device, and a connection between the rolling device and said switch for at least partially controlling the latter independently of said trigger, wherein the switch includes a mercury tube and the trigger tilts the tube to circuit closing position to actuate the coating device and wherein said connection includes means for tilting the tube to circuit opening position to shut off the coating device.

7. Apparatus of the class described comprising a conveyor thereon, a coating device, a trigger adjacent said conveyor, a switch at least partially controlled by said trigger, an electro-magnetic device controlled by said switch, said device controlling said coating device, a rolling device, and a connection between the rolling device and said switch for at least partially controlling the latter independently of said trigger, wherein the switch includes a mercury tube and the trigger tilts the tube to circuit closing position and wherein said connection includes means for tilting the tube to circuit opening position by bodily movement of the tube to engage one end of the tube with a fixed tripping member.

8. Apparatus of the class described comprising a support, an arm pivoted thereon, a roller journaled in the arm for swinging movement toward and away from the support with the free end of said arm, a second arm carried by the support having its free end connected for swinging the first mentioned arm, a rotatable cam engaging the said second arm for causing said swinging movement of both arms together with said roller, a second cam rotatable with the first mentioned cam, and dispensing means controlled at least in part by said second cam.

9. Apparatus of the class described comprising a support for moving a coilable body thereon, an arm pivoted thereon, a roller for rolling the body axled in the arm for swinging movement toward and away from the support with the free end of said arm, a second arm carried by the support having one end connected to the first mentioned arm for swinging the latter, a rotatable cam engaging the said second arm for causing said swinging movement of both arms, a shaft in driving relation to said cam, a second cam keyed to said shaft, a cam follower for said second cam, and means at least partially controlled by said cam follower for dispensing a substance onto the body prior to engagement by said roller, said last mentioned means being also controlled in part by travel of the coilable body therepast.

10. Apparatus of the class described comprising a support for moving a coilable body thereon, fluid dispensing means disposed over the path of said body, said dispensing means including a pipe carrying the material to be dispensed under pressure, an electro-magnetic valve in said pipe, a switch controlling the valve, a trigger in the path of the body for at least partially controlling the switch to open the valve, an arm pivoted on the support, a roller for coiling the body axled on the arm for swinging movement toward and away from the support with the free end of said arm, a toggle device having one end connected with the said arm for swinging the latter and its other end pivoted to the support, a rotatable cam engaging the said toggle device for causing said swinging movement of said roller, a shaft in driving relation to said cam, and a connection between the shaft and the switch for at least partially controlling the valve independently of the trigger to effect closing of the valve.

11. Apparatus of the class described comprising a support, a platform thereon, a roller mounted thereabove, said roller being of the squirrel-cage type and comprising a pair of end discs and transverse rods connecting the discs and circumferentially spaced apart, means for rotating the roller while causing relative movement of the platform and the axis of the roller in parallel horizontal planes, means for raising and lowering the roller away from and toward said platform during said relative movement, said last mentioned means including mechanism for causing the roller to descend at a more rapid rate than it rises, and a common actuator for both said means.

12. Apparatus of the class described comprising a platform, said platform including spaced apart flight lugs and auxiliary flight lugs of larger proportions spaced relatively closely to the first mentioned flight lugs, a roller mounted thereabove, means for rotating the roller while causing relative movement of the platform and the axis of the roller in parallel horizontal planes, means for raising and lowering the roller away from and toward the platform during said relative movement, the last mentioned means including a cam driven by the first mentioned means and a cam follower in controlling relation to said raising and lowering means, said cam being of a volute contour which causes the roller to rise gradually and to descend more rapidly than it rises, and a common actuator for both said means.

MORRIS COHEN.
GERALD A. JORGENSON.
GEORGE HASTY.